United States Patent
Ravikumar et al.

(10) Patent No.: US 8,346,754 B2
(45) Date of Patent: Jan. 1, 2013

(54) GENERATING SUCCINCT TITLES FOR WEB URLS

(75) Inventors: Shanmugasundaram Ravikumar, Berkeley, CA (US); Deepayan Chakrabarti, Mountain View, CA (US); Kunal Punera, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1170 days.

(21) Appl. No.: 12/194,263

(22) Filed: Aug. 19, 2008

(65) Prior Publication Data

US 2010/0049709 A1 Feb. 25, 2010

(51) Int. Cl.
*G06F 17/30* (2006.01)
(52) U.S. Cl. ........................................ 707/709
(58) Field of Classification Search .......... 707/705–731, 707/741–755
See application file for complete search history.

(56) References Cited

U.S. PATENT DOCUMENTS

| | | | | |
|---|---|---|---|---|
| 2003/0182295 A1* | 9/2003 | Ukai et al. | | 707/100 |
| 2007/0112764 A1* | 5/2007 | Yih et al. | | 707/5 |
| 2007/0143282 A1* | 6/2007 | Betz et al. | | 707/5 |
| 2008/0021924 A1* | 1/2008 | Hall et al. | | 707/103 X |
| 2008/0172741 A1* | 7/2008 | Reumann et al. | | 726/23 |
| 2009/0210419 A1* | 8/2009 | Chitnis et al. | | 707/6 |
| 2010/0058204 A1* | 3/2010 | Wilson | | 715/760 |

OTHER PUBLICATIONS

R. Jin, "Statistical Approaches Toward Title Generation", 2003, Phd Thesis, Carnegie Mellon University.

* cited by examiner

*Primary Examiner* — Wilson Lee
(74) *Attorney, Agent, or Firm* — Martine Penilla Group LLP

(57) ABSTRACT

Methods, computer programs, and systems for generating a link title for a URL (Uniform Resource Locator) within a context webpage to be shown as a web result are provided. The method evaluates generation parameters for a plurality of sources for picking words from the link title. Further, the method generates candidates for the link title, and a likelihood is computed for each candidate. When computing the likelihood, the generation parameters, the context webpage and the words are considered. In addition, the method selects a candidate with the highest likelihood from all the computed likelihoods, and presents the URL with the selected candidate as the title.

20 Claims, 7 Drawing Sheets

GENERATING SUCCINCT TITLES FOR WEB URLS

BACKGROUND

1. Field of the Invention

The present invention relates to methods for improving internet search results, and more particularly, methods and systems for generating a link title for a URL (Uniform Resource Locator) within a context webpage to be shown as a web result.

2. Description of the Related Art

The propensity of a user to click a hyperlink is highly influenced by the text associated with the hyperlink, commonly known as anchortext. Both content creators and search engines have constantly exploited this fact to attract more user clicks. Content creators tend to provide hyperlinks with meaningful anchortext to make intra-site navigation convenient for the user. The hyperlinks and their anchortext are commonly used by web search algorithms for ranking purposes.

The task of assigning link titles is rather simple for content creators because creators presumably understand the topology of their own site and use content-management systems to cope with scale. A search engine, on the other hand, is faced with the challenging task of automatically providing the right 'title', which is referred to herein as the link title or quicklink, and a summary, so that users are persuaded to click on the search result. Providing an appropriate title is extremely important as eye-tracking studies have shown that search engine users focus a lot of their attention on the link title of the results, paying even more attention to the link title than to the summary provided along with the result.

It is in this context that embodiments of the invention arise.

SUMMARY

Embodiments of the present invention provide methods, systems and computer programs for generating a link title for a URL within a context webpage to be shown as a web result from an Internet search. It should be appreciated that the present invention can be implemented in numerous ways, such as a process, an apparatus, a system, a device or a method on a computer readable medium. Several inventive embodiments of the present invention are described below.

In one embodiment, a method for generating a link title for a URL within a context webpage to be shown as a web result is provided. The method evaluates generation parameters for different sources of potential title candidates. The generation parameters describe the probability that each source, when constructing text instances, picks words from the true title or the context webpage or the general vocabulary. Further, the method generates a plurality of candidates for the link title from the different sources. Candidates can also be generated by methods other than picking from the different sources, like be specified by rules created by domain experts. A likelihood probability is computed for the generation of the text instances of each different source by substituting each candidate for the true title and taking into account the generation parameters for the source that generated the text instance, the context webpage and the contributed words by the different sources. The method then selects the candidate which results in the highest likelihood of the different sources generating their instances. The selected candidate is presented to a user as the link title associated with the URL. In another embodiment, this method is implemented by a computer program embedded in a computer-readable storage medium.

In another embodiment, a method for presenting related URLs when displaying results from a web search is provided. The method obtains a related URL associated with a context webpage obtained as a result of the web search. Link title candidates for the related URL are generated, and a likelihood probability is computed for each of the link title candidates. The likelihood probability is computed using learned probabilities for a source to pick words from the link title, the probabilities associated with each of the words in the candidate, and the probabilities associated with the context webpage. Once the likelihoods are calculated, the candidate which results in the highest likelihood of the different sources generating their instances is selected, and the web results are presented to a user. The results presented include at least the context webpage and the related URL with the selected candidate as the link title. In another embodiment, a plurality of related URLs, with their respective selected link titles, are presented with the context webpage to the user.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

The following embodiments describe methods, computer programs, and systems for generating a link title for a URL (Uniform Resource Locator) within a context webpage to be shown as a web result are provided. It will be obvious, however, to one skilled in the art, that the present invention may be practiced without some or all of these specific details. In other instances, well known process operations have not been described in detail in order not to unnecessarily obscure the present invention.

Figure 1:
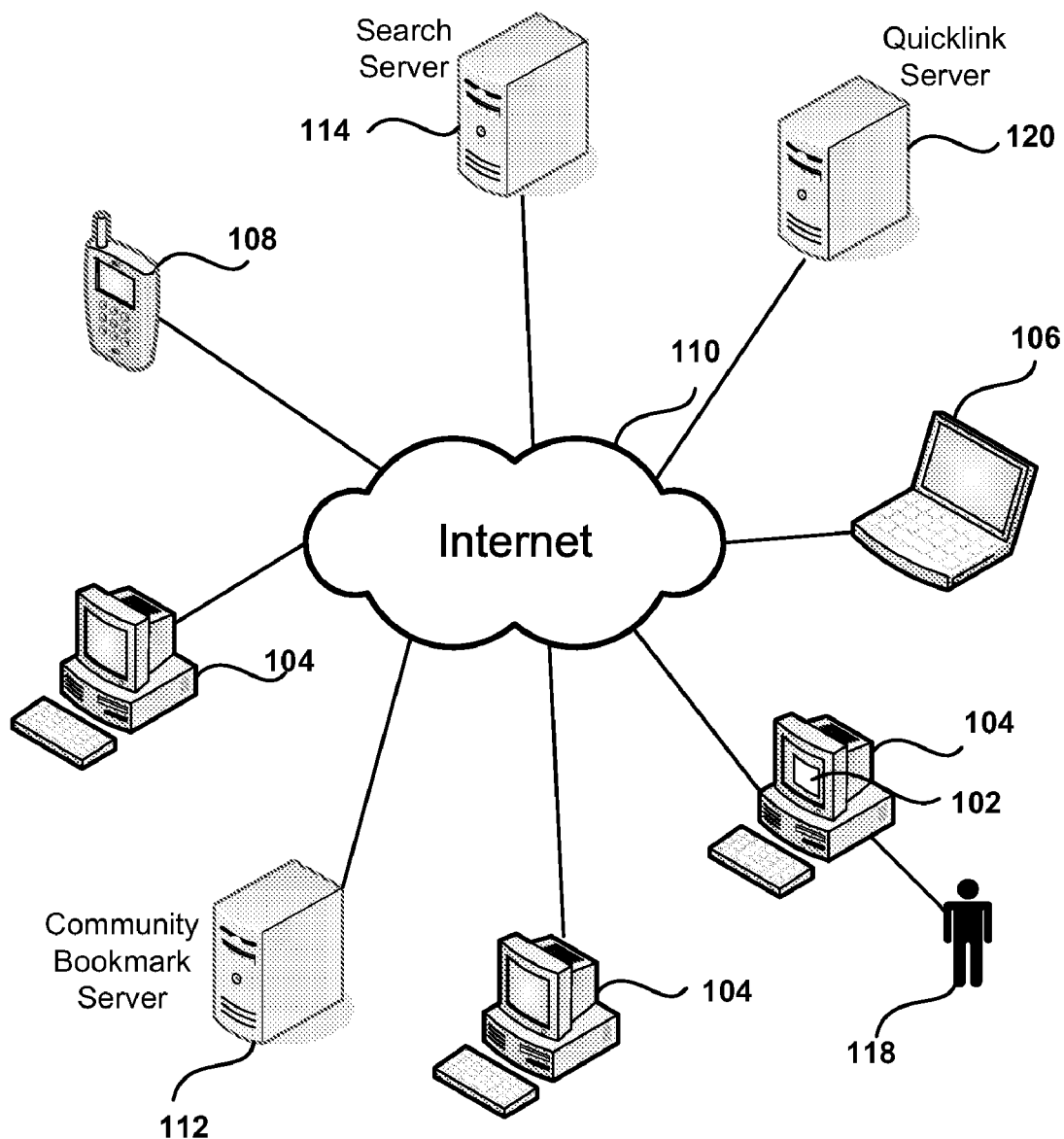
FIG. 1 describes a simplified schematic diagram of a network system for implementing embodiments of the present invention.

FIG. 1 describes a simplified schematic diagram of a network system for implementing embodiments of the present invention. Internet 110 is used to interconnect users with servers. Users 118 access the Internet 110 via a variety of the devices, such as PCs 104, laptops 106, mobile phones 108, etc. These are merely examples, and any other device used to access Internet 110 can be used to implement embodiments of this invention. For example, the devices may be wired or wireless. In one embodiment, a browser 102 is executed on a device, and the graphical user interface is presented on a display. Browser 102 provides the functionality for accessing the Internet.

Search server 114 provides search services to Internet users. Quicklink server 120 enhances the search results from queries to search server 114 by adding quicklinks to search results. Although different servers are described by way of example, the person skilled in the art will appreciate that multiple configurations are possible by combining several servers into one system, by having distributed systems where a single function can be accomplished by a plurality of different servers scattered across the Internet, or by caching information from the different databases at the different servers to accelerate the processing of information.

Community bookmark server 112 provides Internet users the ability to bookmark Internet sites for future easy access. The bookmarks are stored into community bookmark server 112 instead of being stored in browser 102 of their local system. This way, bookmarks are always available to Internet users 118, independently of the system used to access Internet 110. An example of a community bookmarking service available today is Del.icio.us™, but the embodiments of this invention are not construed to this service and can be used in conjunction with any other community bookmarking service.

Figure 2:
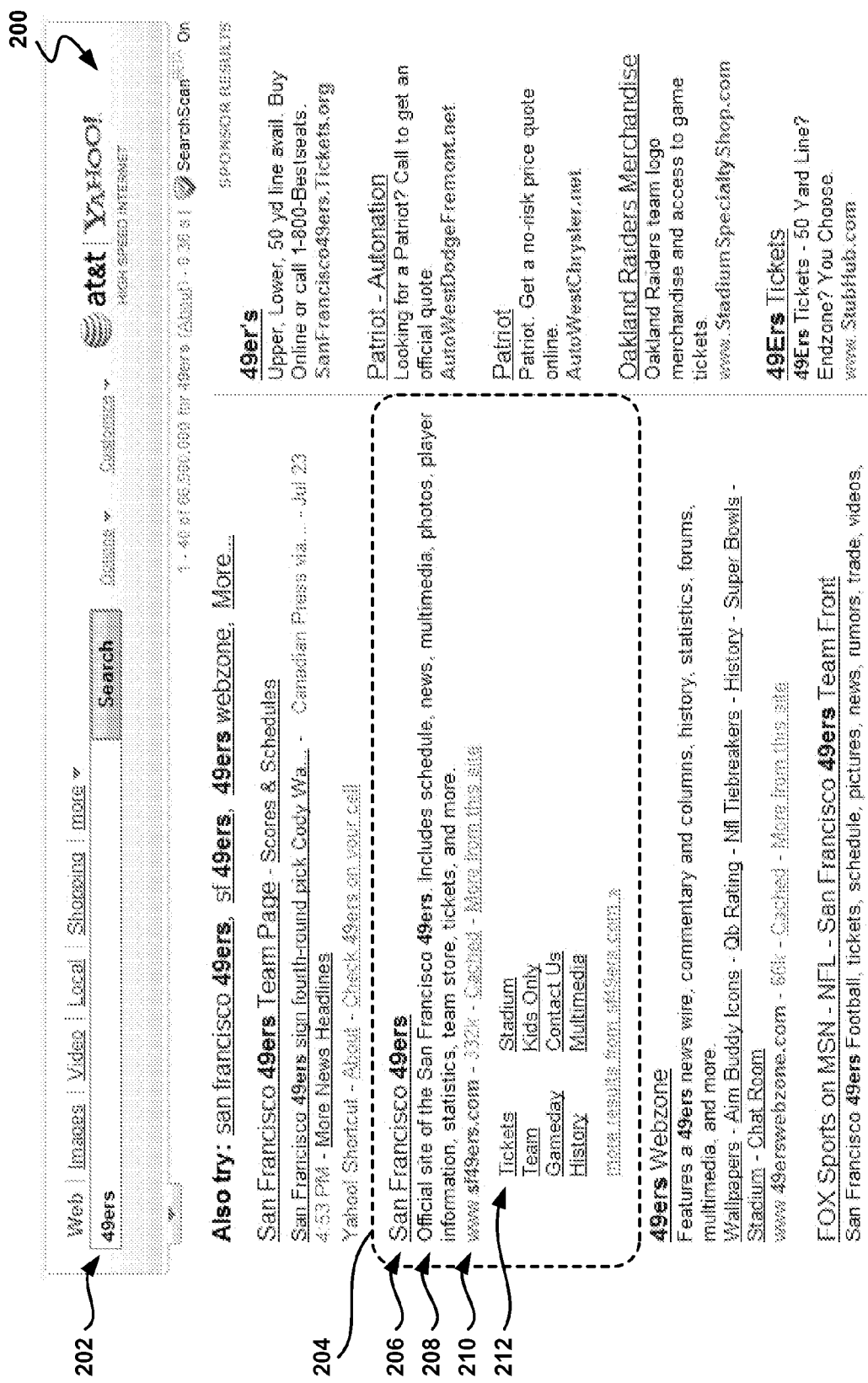
FIG. 2 shows the presentation of results after a web search that includes quicklinks, according to one embodiment.

FIG. 2 shows the presentation of results 200 after a web search that includes quicklinks, according to one embodiment. Initially, a query 202 is submitted to a search server 114, as seen in FIG. 1, with a list of terms and occasionally logical operators, which identify the desired parameters for the search. Search server 114 generates search results 200. Included here is a simplified representation of the search results, and the person skilled in the art will appreciate that additional information may be included with the search results, such as suggestions for related queries, sponsored website information, links to additional search results, size of page referenced by the URL, cached versions of the website, maps or links to maps, advertisements, links to other services offered by the search provider, etc.

Search results 200 include query 202 that originated the search, and a plurality of website search results 204. Each website search result 204 includes title 206, abstract 208, and URL 210. In the following description, URL 210 is referred to as the context webpage, because it is within this context webpage that link titles, such as link title 212, are selected. Title 206 is a one-line description of the content found on the website. Abstract 208 contains information that has been parsed by search server 114 from the website to provide a more detailed description of the content than the one provided by title 206.

Website search result 204 includes a plurality of quicklinks, such as quicklink 212, also referred to as sub-queries, that provides additional destination options for the user. The destination options are typically links inside context webpage 206. Embodiments of the present invention use information from a diverse collection of sources to automatically generate link titles for URLs. The context in which the link title will be used and constraints on title length are additional considerations for generating the link titles. While the embodiments presented here describe how to select quicklinks for presenting internet search results, the methods and systems presented can also be used for obtaining titles for URLs that lack a good title, constructing succinct sitemaps, and other similar applications requiring the generation of short titles.

A naive approach to finding a title is to use the title of the URL itself. This solution is not effective for two reasons. The first reason relates to the poor availability and quality of titles for URLs. At least 17 percent of HTML documents lack titles (this estimate was obtained by analyzing one million random URLs). Moreover, even if the URL has a valid title, the title can be erroneous, incomplete, long, or simply not the best title. For example, at the time of writing this application, the URL www.sigir2008.org/schedule.html on the SIGIR 2008 conference website has the title 'SIGIR'08-Singapore'. This title is clearly not the best title because 'Conference Schedule,' the topic of the web page associated with the URL, is not indicated in the title.

The second reason why the title of the URL is not an effective solution relates to the presentation and user-experience considerations of search results. A search engine has limited display real estate to present the link titles of search results and hence link titles cannot be overly long. The real estate is even more critical if the URL is displayed as a quicklink along with a search result, as seen in FIG. 2. For example, link title 212 "Tickets" is one of the quicklinks displayed for www.sf49ers.com website. The search engine must avoid presenting redundant information in the link title of the quicklink, such as "49ers tickets" because the word "49ers" is superfluous within the context of search result 204 referring to the "49ers" website. The link title of the quicklink must therefore be derived keeping in consideration the context (such as the parent URL) in which the link title is displayed.

Most solutions for generating titles consider the document to be summarized as the only source of information, while a few solutions try to combine information from multiple sources into one coherent summary. Two approaches have been used to generate titles using only the web page as the source. One approach is linguistics-based and uses the deep structure of the page content in order to pick important sentences and phrases, which are then combined to form summaries or titles. A second approach is based on statistical translation techniques, and uses probabilistic model-based methods to pick relevant titles. There are several reasons why these two approaches are not relevant to link title generation. Looking at the document in isolation ignores other rich sources of side information that are often available for web pages, such as anchortext of inlinks to the web pages, or user tags placed on those. In addition, another important source of information is ignored, the context of another document or web page, which is critical for applications such as quicklinks and sitemaps. Finally, algorithms that depend on computing probabilities are often aimed at particular domains, and often do not scale well when applied to a corpus as large and varied as the web.

Other approaches to combine multiple sources are not efficient for generating quicklinks. One approach uses template operators that can be used to search for contradiction, refinement, agreement, and other such descriptors of the relations between pairs of sources. Another approach uses latent semantic analysis. Still yet, another approach uses a maximum marginal relevance heuristic to generate a query-dependent summary by adding sentences that are both relevant to the query and the document, while having minimal similarity to sentences already in the summary. These methods focus on building a summary that is a combination of sentences from multiple sources. However, this is not helpful for obtaining link titles because a link title must be succinct and present one idea, and not a combination of words or phrases with possibly different semantics. Also, combining sentences is not the same as generating a link title under a given context because sentences that are already known from the context should be excluded from the link title.

The methods, systems and programs presented in this invention can be applied to a variety of specific link title generation tasks. A first possible application is to obtain link titles for quicklinks. Quicklinks occur in the context of a parent URL and their link titles are constrained to be short.

Furthermore, succinct sitemaps can be automatically constructed for a given website. A third application automatically obtains a link title for a web page that is to be shown as a search result. This is especially useful in cases when the title in the HTML content of the web page either is of poor quality, way too long, or does not exist. A fourth application is to obtain titles for non-HTML documents, especially, for videos, images, portable document format (PDF) files, or Microsoft Word files (.doc). It should be noted that some of the information sources might not be very useful in this case, such as image and video files, because the files are not readily interpretable as text to construct link titles.

Embodiments of the present invention use information contained not just in a single document (web page), but also in other relevant sources. Relevant sources include queries for which the web page was viewed or clicked, Del.icio.us™ tags, the URL of the web page, hyperlinks to the web page, etc. The relevance of each source is assessed and accounted for while selecting the best link title. Further, the link title is generated under a certain context, such as the parent webpage. For example, the link title for a quicklink fedex.com/Tracking for the site fedex.com must focus more on the "tracking" aspects of the quicklink and less on the generic "FedEx" aspects available from the main website page. The link title of a given web page is constructed to emphasize aspects that differentiate the link title from the context provided by another web page. Finally, short link titles are favored over long link titles. User studies showing single-word link titles to be the most preferable.

In one embodiment, words from the appropriate link title and context of a URL are preferentially used to construct all the text from various sources associated to the URL. The probability of a word "generated" by a source of information for the web page is a convex combination of the link title, the context, and the full vocabulary. Applying the maximum likelihood principle, using a training set of URLs with labeled link titles, would be inadequate because maximum likelihood does not take into account the quantitative and qualitative differences between the various sources. Instead, source specific weights are used in a likelihood framework, and a Ranking SVM (Support Vector Machine) method is used to calculate these weights. In addition, the framework also incorporates length constraints on link titles.

A set S of sources of information for each web page is available. Associated with every pair (w, s) of a web page w and a source s∈S is a (possibly empty) set I(w, s)={$(t_1, x_1)$, . . ., $(t_n, x_m)$}, where each tuple $(t_i, x_i)$ represents a text instance with the corresponding weight. For example, the Clicked-Queries source (described below) for the web page fedex.com/Tracking may contain the tuple ("FedEx Tracking Number", 51). The first field is a search engine query for which fedex.com/Tracking was returned as a result and then clicked. The second field is the number of such occurrences. Let $S_c \subset S$ be the set of sources suitable to extract candidate link titles from. Additionally, let's define I(w)=$\cup_{s \in S}$I(w, s) and $I_c(w) = \cup_{s \in S_c}$I(w, s) as the set of all text instances and link title candidates respectively for web page w. Slightly abusing notation, I(w) and $I_c(w)$ are also used to refer to just the texts (i.e., the first fields), ignoring the associated weights. The goal is described using this notation as picking the best link title T(w,b)∈$I_c$(w) for w with respect to b, given a context web page b and a specific web page w, along with I(b), I(w), and a candidate link title set $I_c$(w). It should be noted that T(w, b) needs not be the same as the contents of the <title> field in the HTML of web page w. The latter may not even exist. In one embodiment, extraction methods are used to generate candidate link titles, which are then ranked using statistical methods. The highest-ranked candidate is returned as the link title.

There are many potential sources of information regarding any given web page. These include the URL, title, and key phrases of the web page, anchortext on links pointing into the web page, search queries for which the web page was returned as a top result, and any user-generated tags for that web page. A list of possible sources is described below in Table 1, but any other source with information regarding a link title can be used within embodiments of the present invention.

TABLE 1

| Source | Description |
| --- | --- |
| Intra-AT* | Anchortext on intra-site links |
| Inter-AT* | Anchortext on inter-site links |
| AT-from-HP* | Anchortext on link from b to w |
| Viewed-Queries | Search queries for which w was returned in the top 10 results |
| Clicked-Queries* | Search queries for which w was returned as a result, and clicked |
| First-Clicked-Queries* | Search queries for which w was the first result, and clicked |
| Page-Title* | Title of w |
| URL-Tokens | Word tokens from the URL of w |
| Prisma* | Extracted key phrases in w's content extracted |
| Delicious | Tags for w from del.icio.us ™ |

Since link titles are typically very short, the odds of an existing word or phrase from these sources being the link title are high. However, not all sources are good for link titles. Spelling mistakes may be common in some sources (e.g., queries that don't generate clicks), while some sources might not even provide complete phrases (e.g., a token from a web page URL). In one embodiment, only a subset of sources is used for candidate link titles, the ones starred in Table 1. In other embodiments, all the sources are used or different subsets of sources from Table 1 are used.

Figure 3:
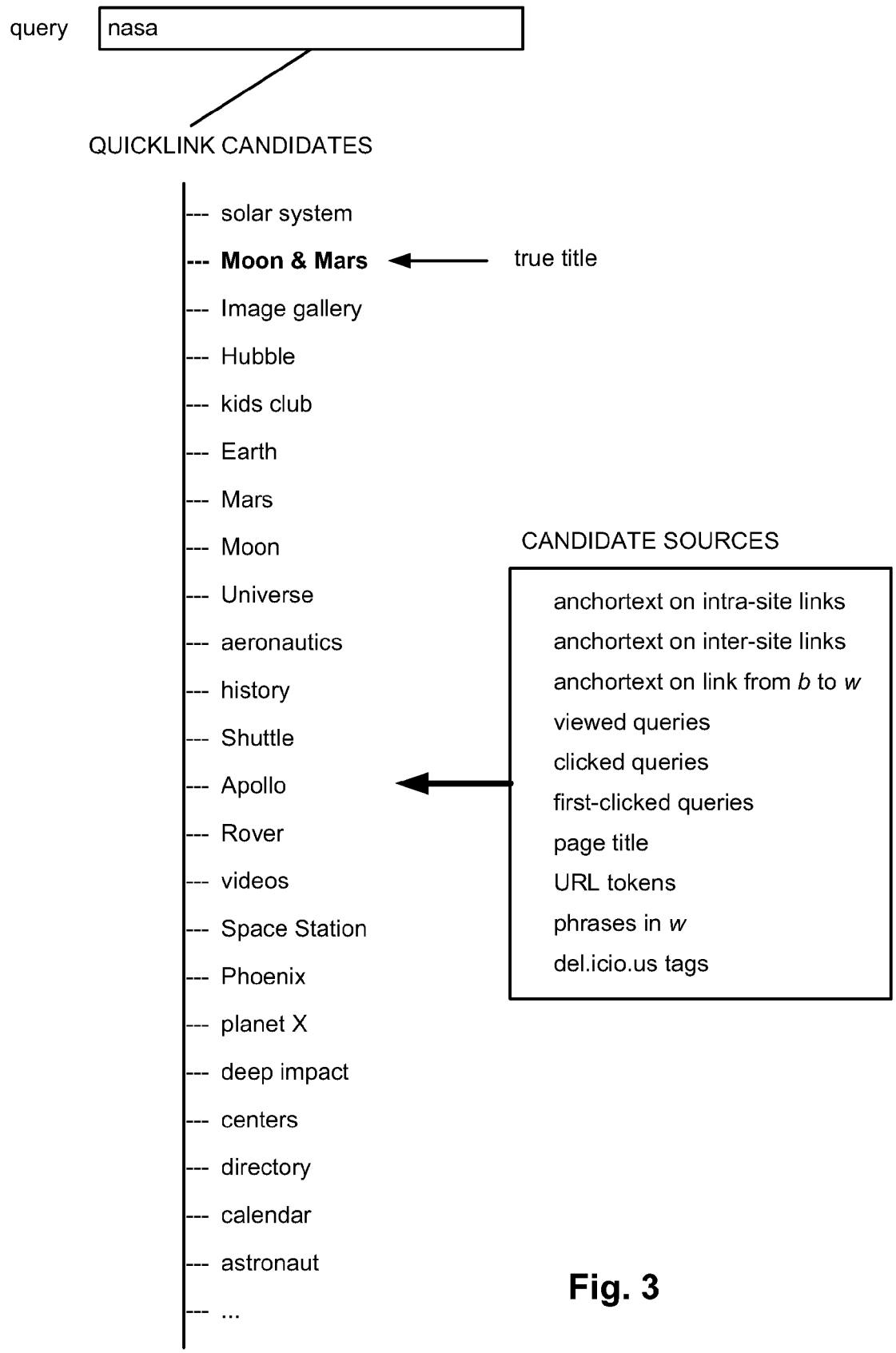
FIG. 3 describes an embodiment for generating quicklink candidates and the sources for obtaining quicklink candidates in accordance with one embodiment of the invention.

FIG. 3 describes an embodiment for generating quicklink candidates and the sources for obtaining quicklink candidates in accordance with one embodiment of the invention. A query of "nasa" is entered by a user. In one embodiment, a link title is searched for a URL in the main NASA website corresponding to "Moon & Mars." A list of quicklink candidates is generated from different sources, as previously described. "Moon & Mars" is considered the true title because this title best reflects the URL. Other candidates like "Mars" or "Moon" will score highly as they are closely related to the true title.

Compared to the rest of the vocabulary, words from the link title T(w, b) and the context web page instances I(b) are preferentially used in all the text instances I(w) associated with web page w. However, the degree of preference may depend on whether the word occurs in the link title, in the context I(b), or both. In addition, not all sources have equal weight. The model differentiates between the sources. For example, the Intra-AT source might use more words from the link title than the URL-Tokens source. In fact, the latter source is more likely to use words associated with the context web page I(b), as shown in testing.

One embodiment associates two parameters, $\alpha_s$ and $\beta_s$, with each source s∈S. Whenever a new word needs to be "generated" by source s for web page w, the word is drawn from the words in T(w, b) with probability $\alpha_s$, from I(b) with probability $\beta_s$, and from the full vocabulary V with the remaining probability. In one embodiment, a slight variation is performed by replacing I(b) with a specially chosen subset W(b), discussed below. Thus, the probability of generating word x from source s is given by the following equation:

$$P_s(x \mid W(b), T(w, b)) = \alpha_s \cdot \frac{\#\{x \in T(w, b)\}}{|T(w, b)|} + \beta_s \cdot \frac{\#\{x \in W(b)\}}{|W(b)|} + (1 - \alpha_s - \beta_s) \cdot \frac{\#\{x \in V\}}{|V|} \quad (1)$$

The $\#\{x \in \ldots\}$ notation indicates the number of times x occurs in a given multiset. $|T(w, b)|$, $|W(b)|$, and $|V|$ represent the size of the respective multisets. Equation (1) ties the data observations, that is the words generated by the sources, with the link title of the page and the source parameters $\alpha_s$, and $\beta_s$. Thus, equation (1) fits the model parameters when provided the correct link title T(w, b) (such as the training phase discussed below), and infers the best link title for new (w, b) pairs using known model parameters (i.e., the testing phase). Two methods are described for training and testing. The first embodiment, referred to as naive formulation, serves to illustrate the basic ideas. The second embodiment, referred to as full formulation, is based on the naive formulation and adds additional parameters, which makes the model more realistic and accurate but at the cost of increased complexity in the model fitting process.

In the naive formulation, $\alpha_s$, and $\beta_s$ are assumed to be known for all sources s. Given w and b (and hence W(b)), the likelihood L of any candidate link title t can be "naively" computed as:

$$L(t \mid w, b, W(b)) = P(I(w) \mid W(b), t) = (\Pi_{s \in S} \Pi_{(x,n) \in I(w,s)} [P_s(x \mid W(b), t)]^n \cdot P_{len}(|t|) \quad (2)$$

$P_{len}(|t|)$ is the a-priori probability of the link title being a certain length, and is determined from a training set. This formulation assumes that the sources are independent, which is untrue for some sources (e.g., Viewed-Queries and Clicked-Queries), but this "naive" formulation serves as a reasonable starting point.

If a word x occurs repeatedly in I(w), then the corresponding $P_s(x)$ terms will significantly affect the likelihood (Equation (2)), whose maximization will in turn require higher values of $P_s(x)$. This happens if x occurs in the candidate link title t. Thus, link titles containing frequently occurring words are preferred, as expected. However, there is also a strong source-specific dependence. If a source s is highly likely to use words from the link title, that is $\alpha_s \approx 1$, then any candidate link-title t that does not include a word x from s will cause extremely low $P_s(x)$ values, dragging down the likelihood and reducing the candidate's appeal. The presence of the $\beta_s$ term is also critical because, had $\alpha_s$ been the only parameter, then any repeated words, even those that occur frequently in the context web page, would be preferentially picked to be in the link title. The $\beta_s$ term ensures that such words have relatively high $P_s(x)$ values even if they do not occur in the link title. The relative increase in $P_s(x)$ (and the likelihood) if adding these terms to the link title is much less, thus reducing the pressure to have these terms in the link title. In fact, the pressure from $P_{len}$ to have short titles, especially for the quicklinks title task, will decrease the chance of words from W(b) being present in the link title T(w, b).

In the training phase, the parameter fitting operation is simple under the naive model. Given a training set of web pages, context pages, and their true link titles, $\alpha_s$ and $\beta_s$ can be fitted for all sources by maximizing the likelihood function (2) with respect to these parameters. First, logs are applied to equation (2) to obtain the log-likelihood function as:

$$l(t \mid w, b, W(b)) = \left( \sum_{s \in S} \sum_{(x,n) \in I(w,s)} n \cdot \log P_s(x \mid W(b), t) \right) + \log P_{len}(|t|) \quad (3)$$

The parameter values which cause the derivative to be zero are found. It should be noted that the $\alpha_s$ and $\beta_s$ parameters for different sources "factor out," that is, there are no terms in the log-likelihood that include parameters from two different sources. This factoring out of the log-likelihood function means that the parameters for each source can be optimized independently from other sources, thus simplifying the parameter estimation process. Only one sequential pass over the training data is needed for this computation. During the testing phase, the likelihood of a given set of candidate link titles is calculated and the candidate with the highest likelihood is selected.

In the full formulation approach, two problems in the naive formulation found are addressed. First, there might be imbalances in the number of instances $|I(w, s)|$ for the different sources $s \in S$. For example, the Clicked-Queries source may contribute many different query instances, while the URL-Tokens source may contribute only one candidate, which in one embodiment is w's URL broken up into tokens (e.g., "Music India Online" for www.musicindiaonline.com). Since the naive formulation counts each candidate equally, sources with few candidates can get swamped and have their importance reduced, even if these candidates are good predictors of the correct link title. Second, even if all sources are normalized to have the same number of candidates, the candidates from some sources are "noisier" than others. One example of this problem can be found when comparing the Clicked-Queries and the Viewed-Queries sources. Viewed-Queries provides search queries for which web page w was returned as a result by the search engine. Clicked-Queries also provides pages returned as a result with the additional feature that the search result for web page w was also clicked by the user. Thus, Clicked-Queries are expected to have less noise than Viewed-Queries, and the full formulation takes into account such differences between the sources. Finally, the log likelihood for the naive model (Equation (3)) assumes independent sources, which need not be true in general.

The full formulation applies a source-specific normalization to the candidates. Every instance (x, n)∈I(w, s) of source s is given a weight $\theta_s/|I(w, s)|$, where $\theta_s$ is a source-specific parameter, and $|I(w, s)|$ is the total number of instances for source s. This can be thought of as building a histogram over all the words generated by the source, and then normalizing the histogram so that the histogram sums up to $\theta_s$. The new log-likelihood function for the full formulation approach is:

$$l(t \mid w, b, W(b)) = \left( \sum_{s \in S} \theta_s \cdot \sum_{(x,n) \in I(w,s)} \frac{n}{|I(w, s)|} \cdot \log P_s(x \mid W(b), t) \right) + \theta_{len} \cdot \log P_{len}(|t|) \quad (4)$$

The addition of the $\theta_s$ parameters allows the sources to be dependent. For example, if two sources are identical, a good training algorithm will learn that $\theta_s \approx 0$ for one of these two sources. During the training phase, not only $\alpha_s$ and $\beta_s$ must be estimated, but also $\theta_s$ for each source s. The first two parameters can be learned as in the naive formulation discussed above, but learning $\theta_s$ must follow a different approach. If $\theta_s$ values are found to maximize the log-likelihood function, then some $\theta_s$ parameters can grow to unbounded magnitude.

Constraining the $(\theta_1, \ldots, \theta_{|S|})$ vector to lie within a unit ball, in any $L_p$-norm, leads to a solution where one $\theta_s$ value is one, and all the rest are zero. This follows from the fact that the coefficients of the $\theta_s$ terms and $\theta_{len}$ are sums of log-probabilities, which are all non-positive.

In one embodiment, $\theta_s$ is obtained using extra information that is unavailable in Equation (3). To this point, only the correct link title has been used for training. The new learning routine also takes into account the quality of the available candidate link titles. In one embodiment, the method computes the similarity between a candidate link title and the correct link title, and then learns the $\theta_s$ parameters by linear regression to these similarity values. However, this approach has some pitfalls. For example, two different web pages $w_1$ and $w_2$ with identical instance sets $I(w_1)=I(w_2)$, might have completely different link titles. This can be due to differences in the wording of the correct link titles, or due to differences in the precise content of $w_1$ and $w_2$ that is too fine-grained to be picked up by the available sources, or due to any such factors. The similarity of any given candidate link title to the correct link titles can be completely different for the two web pages, making the regression problem undefined. In general, the exact similarity value is not important, but rather the rankings of the different candidates. It was observed empirically that the rankings remain almost identical for several different similarity functions, including Jaccard similarity, precision, and f-measure. Thus, the ranking of candidates is a better base to learn from, as compared to the similarity values themselves.

The availability of such training data in the form of rankings suggests the use of a learning algorithm based on pairwise preferences, such as Ranking SVM. For known values of $\alpha_s$ and $\beta_s$, equation (4) becomes a linear function in the $\theta$ parameters. The following two-operation approach is used to fit the parameters under this formulation: (1) fit $\alpha_s$ and $\beta_s$ separately for each source s by maximizing the log likelihood and using its "factoring" property, and (2) learn the $\theta_s$ and $\theta_{len}$ values using a linear ranking SVM. The learned values of $\theta_s$ are also indicators of the relative importance of the various sources, and aid in interpreting the final model.

The testing phase is identical to that in the naive formulation. Using Equation (4), the log likelihood of each candidate link title is calculated, and then the best candidate with the highest log likelihood is selected as the proposed link title.

Figure 4:
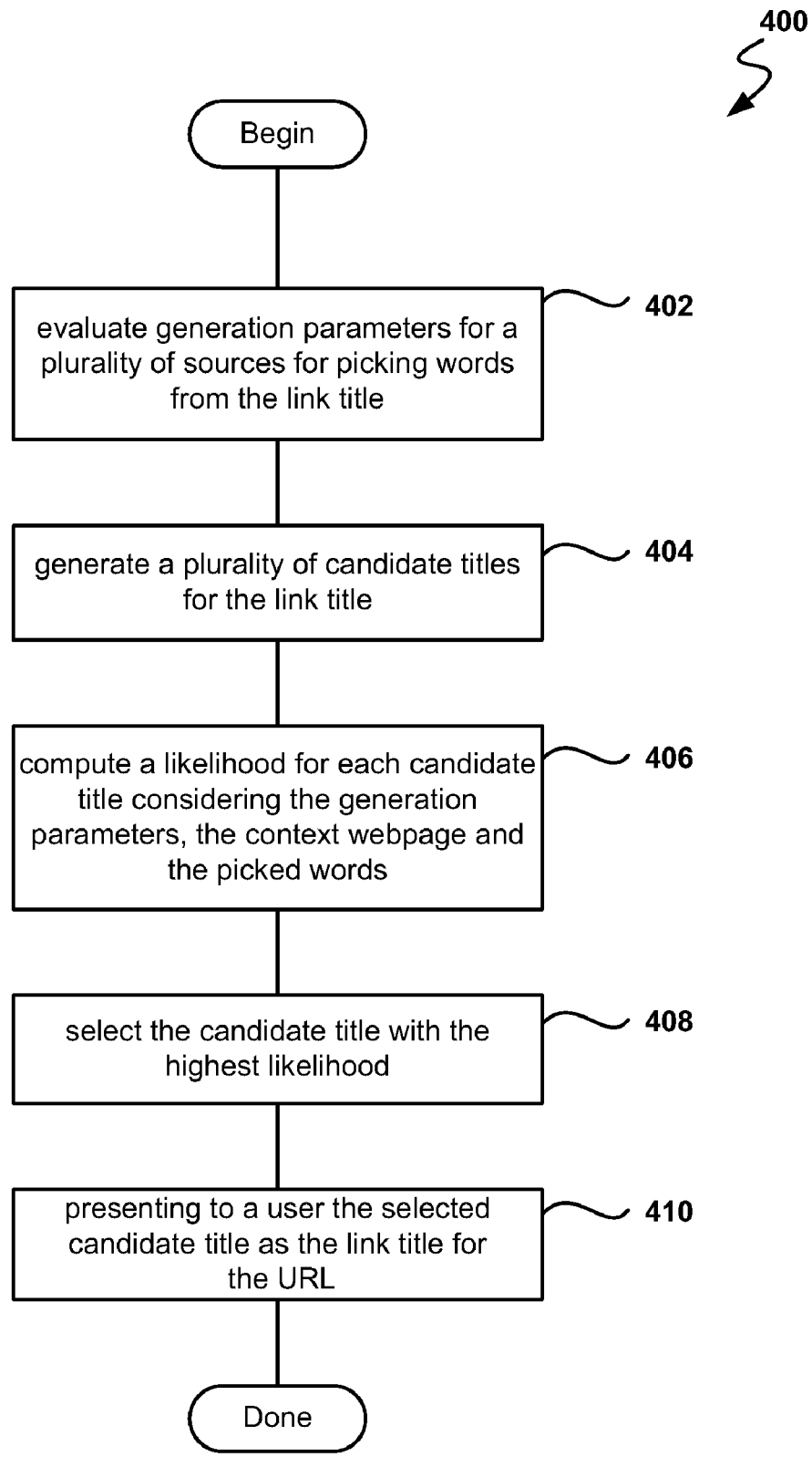
FIG. 4 shows the process flow for generating a link title for a URL within a context webpage to be shown as a web result in accordance with one embodiment of the invention

FIG. 4 shows the process flow for generating a link title for a URL (Uniform Resource Locator) within a context webpage to be shown as a web result in accordance with one embodiment of the invention. In operation 402, generation parameters are evaluated for a plurality of sources indicative of the value associated with the source to pick words from the link title. In one embodiment, parameters $\alpha_s$ and $\beta_s$ are calculated, as previously described using the naive formulation. Operation 404 generates a plurality of candidate titles for the link title. In operation 406, the likelihood of each candidate title is computed. The likelihood calculation takes into account the generation parameters, the context webpage and the picked words. In one embodiment, the likelihood is calculated according to equation (2) previously described. In another embodiment, equation (4) is used.

After the likelihood calculation, the candidate title with the highest likelihood is selected in operation 408. In operation 410, the selected candidate title is presented to a user as the link title for the URL. In one embodiment, the results are presented in browser 102 as seen in FIG. 1.

Figure 5A:
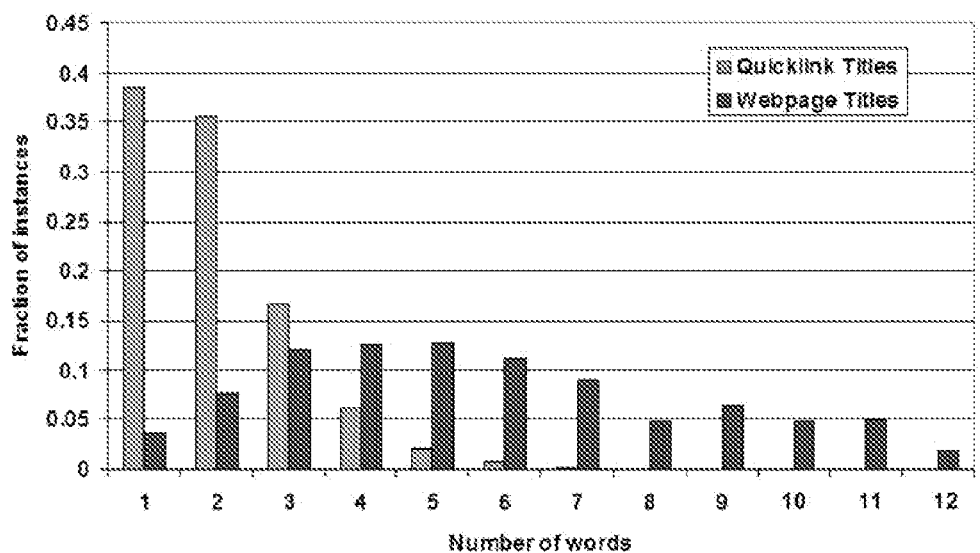
FIGS. 5A-5D show result metrics in graphical form for embodiments of the invention.
Figure 5B:
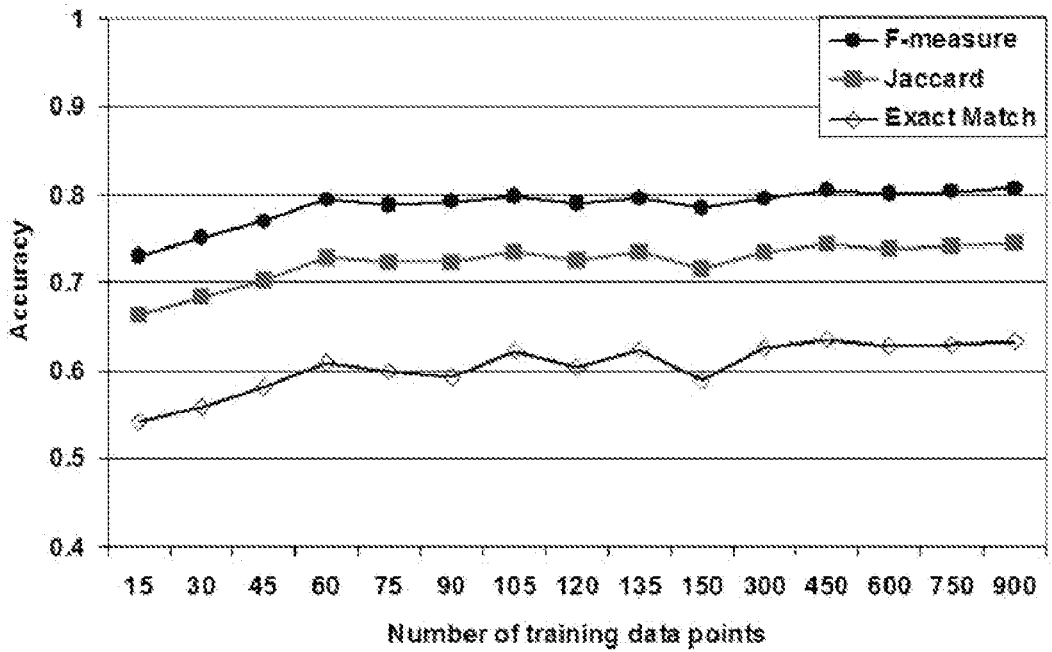

FIGS. 5A-5B show result metrics in graphical form for embodiments of the invention. FIG. 5A shows a histogram for the distribution of title lengths for quicklinks and for web pages without any context web page, according to a study performed by the inventors. The title length for quicklinks is shorter overall than title lengths for web page titles.

Performance of embodiments of the present invention was measured and compared with other existing approaches. Real-world scenarios were used and datasets were constructed for predicting titles for web pages both within and without the context of another web page. Results show that methods of the present invention significantly outperform all baselines and existing approaches.

Two datasets were created to empirically evaluate the performance of the full formulation approach under real-life scenarios, one for quicklinks and the other one for webpage titles. The data set for quicklinks was constructed to simulate the task of predicting titles for web pages within the context of another web page, specifically the website's homepage. A set of around 4,000 of the most accessed websites from search engine logs was selected, and for each website a quicklink selection algorithm picked salient URLs that people often select as navigation destinations. These URLs were then shown to three human judges who manually constructed titles that suitably addressed the content of the URLs in the context of the homepage. In this manner, 2,187 unique titles were constructed for 1,430 URLs. Some URLs were labeled with multiple titles when the judges considered it necessary.

A point should be noted regarding the bias in the data. While the websites present in the dataset were picked randomly, the quicklink URLs for the title generation task were picked in a systematic fashion. Hence, the URLs labeled in this dataset are biased towards frequently navigated web pages within the website. However, this bias is necessary to effectively evaluate approaches that construct titles for quicklinks. When studying web page titles, the title of the web page that is specified in the HTML is often not suitable when the web page is surfaced in a search results page. A dataset of around 60,000 web pages with known titles was constructed, and a learning model was used to predict the original title given to the web page by its creator. Web pages were picked that were likely to show up in the top results of the search engine. About 17 percent of these web pages had unusable titles, and were thrown out. The HTML titles of the rest were used as ground truth.

For the URLs in each of the above datasets, various sources of information were used, as described in Table 1. The texts from the sources were processed via porter stemming. Stopwords were retained while processing candidate link titles for legibility reasons, but were not considered in likelihood computations. The term frequencies in the vocabulary V were computed by processing a large random sample of web pages. The subset W(b) that comprises the words in the context was constructed by taking the top three most common text instances of each source from the context I(b).

In particular, embodiments of the current invention were compared against Prisma and BMW (Banko, Mittal and Witbrock) methods. The Prisma approach was proposed by Anick and Tipirneni for the task of summarizing the contents of a web page or web search results page in as few phrases as possible, so as to provide the user with a succinct description of the content. The Prisma system uses various cues derived from the HTML structure of the web page in order to rank phrases in terms of salience. For instance, phrases within <h1> tags, those at the beginning of the web page, and those in bold are ranked higher. This approach is adapted by picking the highest scoring phrase as the predicted title.

The BMW approach learns parameters which model the tendency of words and bigrams that occur in the content of a web page to also occur in its title. The bigram probabilities in this approach, while ensuring that generated titles are usually grammatically correct, nonetheless increase the amount of data and time needed for training. In our evaluation, the bigram based model took an inordinate amount of time to train and had very poor accuracy because of sparsity of data.

Evaluation of titles is a challenging problem since it needs to be determined both whether the predicted titles are coherent, and whether the titles represent the ideas central to the web page. In order to evaluate the generated titles in terms of similarity to true title, the standard measures of F-measure, Jaccard, Exact Match, and Longest Common Subsequence (LCS) were used.

In the F-measure, the precision of a predicted title is defined as the number of words in the predicted title that also occur in the true title, and the recall is defined as the number of true title words that occur in the predicted title. F-measure is the harmonic mean of these two quantities and measures how well the predicted title and true title agree. A higher value of F-measure indicates greater agreement.

In the Jaccard measure, the degree of overlap between the predicted and true titles is also measured. If both titles are regarded as sets of words, then the standard Jaccard measure is defined as the ratio of the size of intersection to the size of union of the two sets. In particular, we use a multi-set version of the Jaccard measure. This is computed as $(\Sigma_w \min(P(w),T(w)))/(\Sigma_w \max(P(w),T(w)))$, where w iterates over words, and $P(w)$ and $T(w)$ are the number of times w occurs in the predicted and true title respectively. This measure has the effect of penalizing unnecessarily repeated words in the predicted title as this can lead to diminished user experience.

Both measures mentioned above compute accuracy independent of the word ordering. However, the predicted title should be coherently worded and not just a random permutation of useful words. In order to accomplish this, the fraction of test instances for which the text predicts the exact true title is computed in the Exact-match method.

In the Longest Common Subsequence (LCS) measure, the Exact-match measure is made more meaningful for the task of site-map title prediction than web page title prediction. This is because true web page titles tend to be longer and hence almost all approaches score zero in the exact match criteria. Hence, for the web page title generation task our formulations are evaluated based on the length of the longest common subsequence of words between the predicted and true titles.

TABLE 2

|  | Judge1 | Judge2 | Judge3 | Judge1 | Judge2 | Judge3 | Judge1 | Judge2 | Judge3 |
| --- | --- | --- | --- | --- | --- | --- | --- | --- | --- |
| Judge1 | 1 |  |  |  |  |  |  |  |  |
| Judge2 | 0.83 | 1 |  | 0.78 | 1 |  | 0.75 | 1 |  |
| Judge3 | 0.75 | 0.86 | 1 | 0.67 | 0.77 | 1 | 0.48 | 0.72 | 1 |

Table 2 presents the inter-judge agreements computed based on double labeling of quicklinks titles. One judge was considered to be ground truth, and the other judge is evaluated against the one judge. All measures considered are symmetric. Results show that judges agree with each other to a significant extent, indicating that a learning based approach works. However, the agreements are not perfect, indicating that these numbers serve as an approximate upper-bound on how well the best possible algorithm will perform. The title generation approach BMW does not consider context while predicting quicklink titles and hence was not competitive on this particular task, therefore the results for BMW are not shown.

TABLE 3

| Approach | F-measure | Jaccard | Exact match |
| --- | --- | --- | --- |
| Full formulation | 0.81 | 0.75 | 0.63 |
| AT-from-HP | 0.70 | 0.66 | 0.58 |
| Intra-AT | 0.43 | 0.41 | 0.35 |
| Inter-AT | 0.36 | 0.32 | 0.25 |
| Page-Title | 0.37 | 0.27 | 0.05 |
| Clicked-Queries | 0.25 | 0.19 | 0.07 |
| Prisma | 0.24 | 0.22 | 0.13 |

The performance results are presented in Table 3. The full formulation performed extremely well. In fact, the scores obtained by the full formulation are very close to those presented in the inter-judge agreement (Table 2). Moreover, in all three measures, the full formulation far outperforms all other baselines. The results in Table 3 demonstrate that the full formulation approach effectively selected the best candidate from the various individual sources of information about the web page.

FIG. 5B shows a chart of the learning rate under embodiments of the present invention for quicklink title prediction. FIG. 5B plots the accuracy of the quicklink titles predicted against the amount of training data used to learn the models. Accuracy rises rapidly and stabilizes after processing a very small number of labeled data points. Even with as few as 15 labeled quicklinks, the performance is better than always using the AT-from-HP source to predict quicklink titles. The current invention uses very few data points to quickly learn when to predict the AT-from-HP as the true title and when to use some other appropriate source. Moreover, as the amount of supervision given to the algorithm is increased, the accuracy rises rapidly and then stabilizes after around 60 labeled quicklinks have been processed. Therefore, after seeing very few labeled examples, embodiments of the present invention learn to predict quicklink titles with an accuracy that approaches the upper-bound suggested by the inter-judge agreement in Table 2.

Figure 5C:
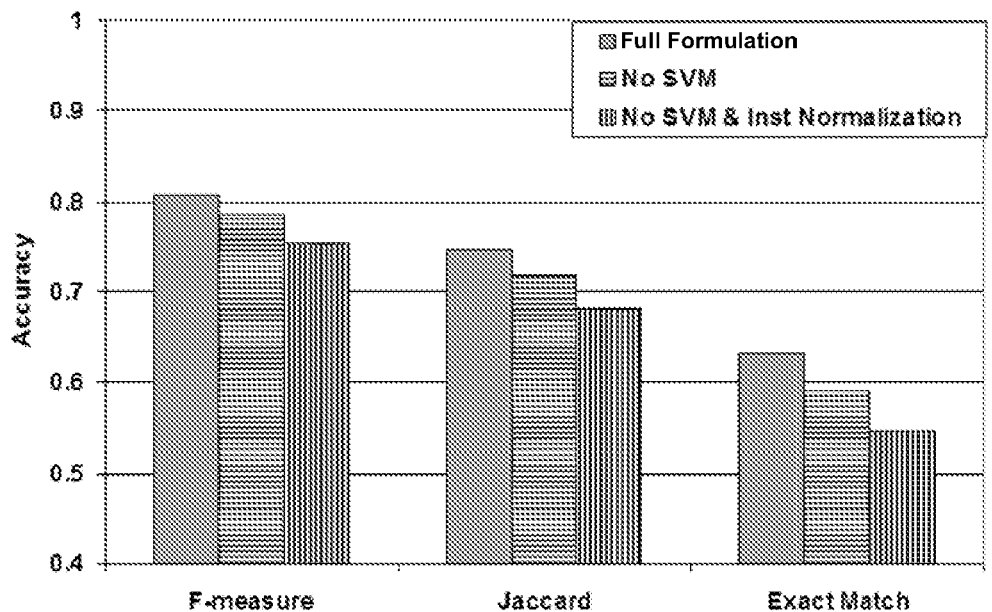

FIG. 5C plots the performance of the full formulation against the approach without any source specific learning and the approach without instance normalization on the quicklink title prediction task. FIG. 5C shows that both enhancements serve to increase the quality of predicted titles. As previously discussed, the naive model does not learn the weights for sources using the Ranking SVM method and does not perform any source-specific normalization. The performances of the different approaches are plotted in terms of three measures, F-measure, Jaccard and Exact Match. The data shows that both additions to the naive model help increase the quality of the quicklink titles predicted.

Figure 5D:
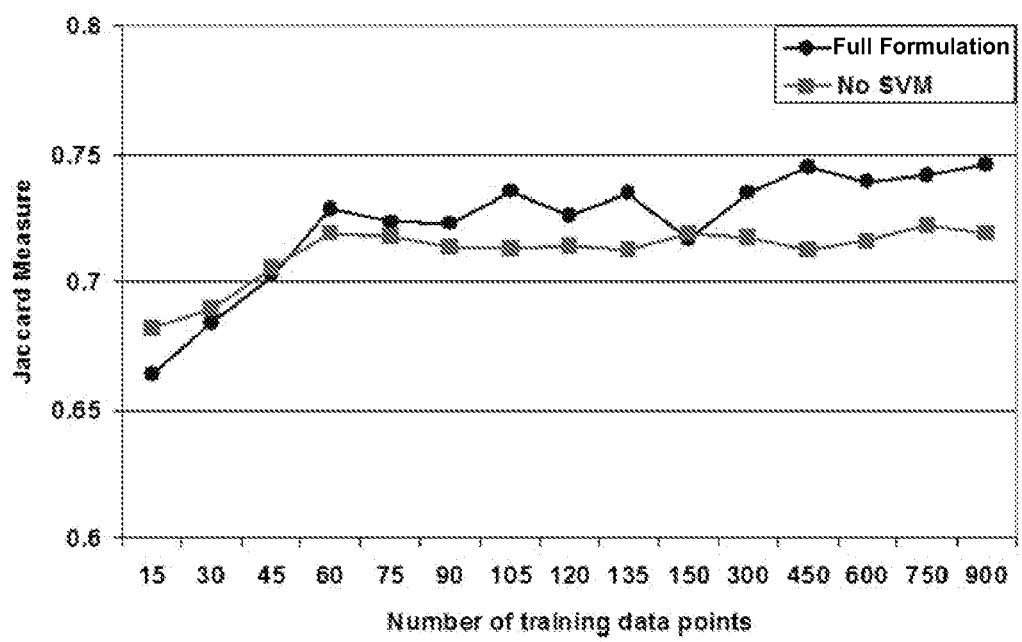

In order to show what is happening in more detail, FIG. 5D shows a learning rate graph plotting the accuracy (in terms of Jaccard) of the full formulation approach and the approach without learning source weights. The full approach has higher accuracy than an approach not using source specific weights (all source weights are 1). Under very "low-data" conditions, the default source weights produce more accurate models. This is because when the full formulation method has access to very limited amounts of data, the parameters learned by the Ranking SVM method do not generalize well. However, as the amount of training data is increased, the only improvement in the performance of the naive approach is due to better estimates of the $\alpha_s$ and $\beta_s$ parameters. Hence, as more data becomes available, the full formulation learns source specific weights and starts performing better.

With respect to the learned parameter values, the $\theta_s$ parameters are indicators of the relative importance of the various sources. The $\theta_s$ parameters are used to rank available sources. For the quicklinks titles task, the ranking of sources in decreasing order of importance is: AT-from-HP, Page-Title, Inter-AT, URL-Tokens, First-Clicked-Queries, Intra-AT, Clicked-Queries, Delicious, Viewed-Queries, and Prisma.

A few observations can be made from these results. First, as intuitively expected, AT-from-HP is the most important source since this text is provided by the website creator specifically for the purpose of describing the web page w from the context web page b. Second, the key phrases obtained from the content of the web page (Prisma) are the least important. This is because, while such phrases are definitely relevant to the quicklink title, these phrases contain a lot of irrelevant information as well. Other sources are much more succinct and relevant to the quicklink title and hence get higher importance. Finally, Clicked-Queries are more important than Viewed-Queries. This makes sense because user clicks imply increased relevance, which makes the source more relevant.

Table 4 shows the performance of various approaches on the task of predicting web page titles.

TABLE 4

| Approach | F-measure | Jaccard | LCS (words) |
| --- | --- | --- | --- |
| Full formulation | 0.53 | 0.41 | 3.44 |
| Prisma | 0.41 | 0.31 | 2.54 |
| BMW | 0.12 | 0.10 | 0.46 |
| AT-from-HP | 0.45 | 0.34 | 2.7 |
| Clicked-Queries | 0.31 | 0.23 | 2.1 |
| Inter-AT | 0.29 | 0.21 | 1.8 |
| Intra-AT | 0.28 | 0.21 | 1.7 |

The full formulation approach avoids the parameter explosion inherent in many algorithms applied to the web corpus by learning parameters for the matches between sources, instead of learning parameters for each possible word, bigram, or phrase. This results in few parameters, and hence, robust generalization. Moreover, the relatively few parameters that need to be estimated make the full formulation approach fast. Finally, the full formulation approach avoids predicting malformed sentences as titles by not changing the candidates obtained from the sources. As Table 4 shows, the full formulation shares almost 3.5 words, on average, in the correct order with the true web page titles.

Figure 6:
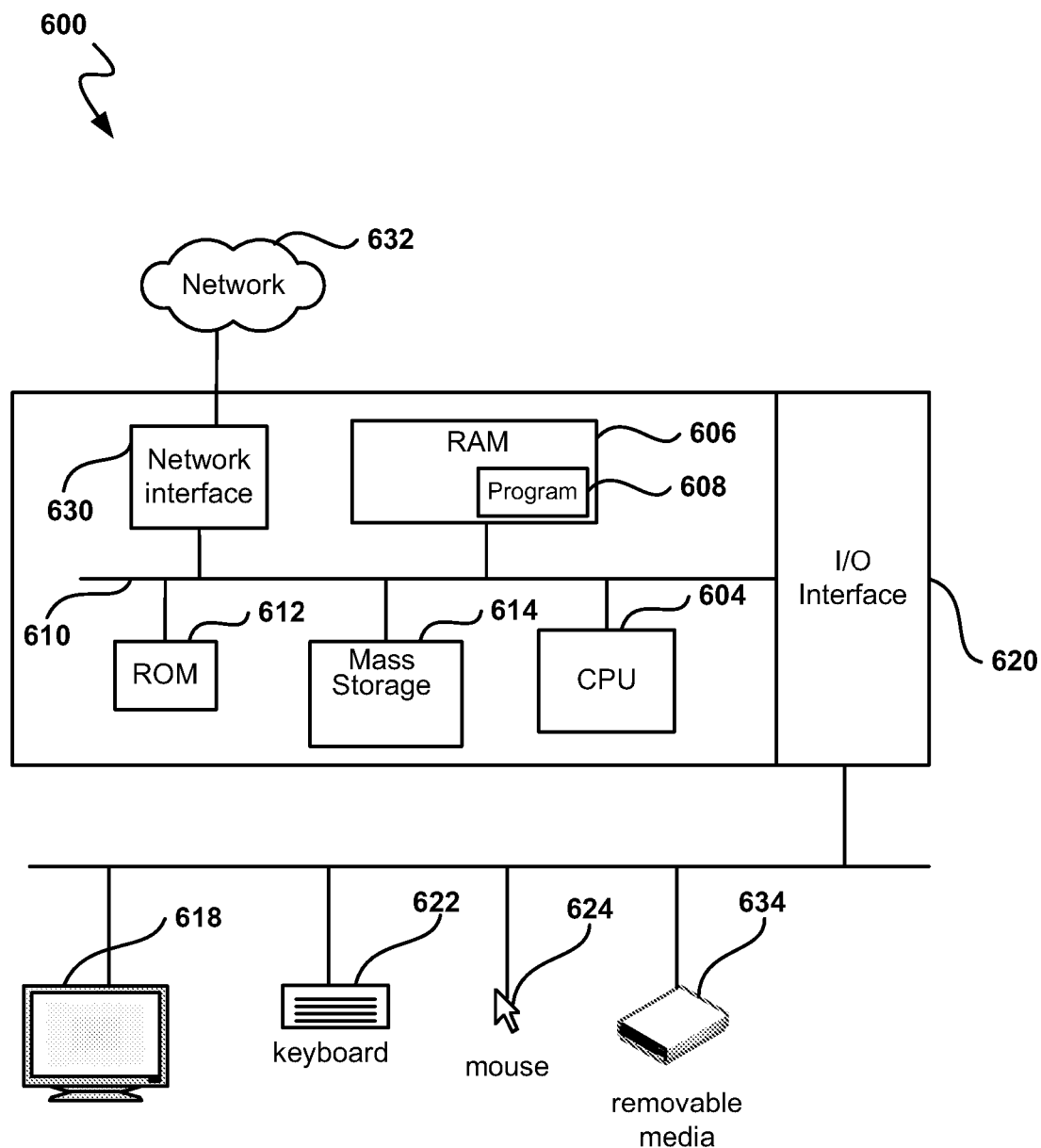
FIG. 6 depicts a computer environment for implementing embodiments of the invention.

FIG. 6 depicts a computer environment for implementing embodiments of the invention. It should be appreciated that the methods described herein may be performed with a digital processing system, such as a conventional, general-purpose computer system. Special purpose computers, which are designed or programmed to perform only one function may be used in the alternative. The computer system includes a central processing unit (CPU) 604, which is coupled through bus 610 to random access memory (RAM) 606, read-only memory (ROM) 612, and mass storage device 614. Title generating program 608 resides in random access memory (RAM) 606, but can also reside in mass storage 614.

Mass storage device 614 represents a persistent data storage device such as a floppy disc drive or a fixed disc drive, which may be local or remote. Network interface 630 provides connections via network 632, allowing communications with other devices, such as search server 114, community bookmark server 112 as seen in FIG. 1. It should be appreciated that CPU 604 may be embodied in a general-purpose processor, a special purpose processor, or a specially programmed logic device. Input/Output (I/O) interface provides communication with different peripherals and is connected with CPU 604, RAM 606, ROM 612, and mass storage device 614, through bus 610. Sample peripherals include display 618, keyboard 622, cursor control 624, removable media device 634, etc.

Display 618 is configured to display the user interfaces described herein, such as browser 102 from FIG. 1. Keyboard 622, cursor control 624, removable media device 634, and other peripherals are coupled to I/O interface 620 in order to communicate information in command selections to CPU 604. It should be appreciated that data to and from external devices may be communicated through I/O interface 620. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can also be distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer program embedded in a non-transitory computer-readable storage medium, when executed by one or more processors, for generating a link title, the computer program comprising:
   program instructions for determining a context webpage URL (Uniform Resource Locator) and a link URL to be shown as a web result, wherein the link URL is embedded inside the context webpage;
   program instructions for evaluating generation parameters for a plurality of sources, the generation parameters indicating a probability of the corresponding source for picking words from a link title for the link URL, the generation parameters for a given source including a probability $\alpha_s$ that the given source, when asked to construct a text instance, picks a word from a true title;
   program instructions for generating a plurality of candidates for the link title;
   program instructions for computing a likelihood for each candidate considering the generation parameters, the context webpage and words from the plurality of sources;
   program instructions for selecting a candidate with a highest likelihood; and
   program instructions for presenting to a user the context webpage URL and the link URL, wherein the selected candidate is presented as the link title for the link URL.

2. The computer program as recited in claim 1, wherein the plurality of sources are chosen from a group consisting of,
   anchortext on intra-site links,
   anchortext on inter-site links,
   anchortext on links for the link URL in the context webpage,
   search queries for which the context webpage was returned in the top ten results,
   search queries for which the context webpage was returned and clicked by a searching user,
   search queries for which the context webpage was the first result presented,
   title of the context webpage,
   tokenized form of the link URL,
   important phrases in the context webpage, and
   user tags from a community bookmarking service.

3. The computer program as recited in claim 1, wherein the generation parameters for the given source further include:
   a probability $\beta_s$ that the given source, when asked to construct the text instance, picks a word from the context webpage,
   a weight $\theta_s$ associated with a relevance for the given source, the relevance indicating a quality of the given source to generate text instances that are related to the target URL, and
   a weight $\theta_{len}$ associated with the length of the true title.

4. The computer program as recited in claim 1, wherein the program instructions for evaluating generation parameters further includes,
   program instructions for obtaining a training set of webpages, context webpages, and the corresponding true link titles,
   program instructions for maximizing the likelihood for the training set to obtain $\alpha_s$ and $\beta_s$, and
   program instructions for learning the $\theta_s$ for the plurality of sources using linear ranking.

5. A method for generating a link title, the method comprising:
   determining a context webpage URL (Uniform Resource Locator) and a link URL to be shown as a web result, wherein the link URL is embedded inside the context webpage;
   evaluating generation parameters for a plurality of sources, the generation parameters indicating a probability of the corresponding source for picking words from a link title for the link URL;
   generating a plurality of candidates for the link title;
   computing a likelihood for each candidate considering the generation parameters, the context webpage and words from the plurality of sources;
   selecting a candidate with a highest likelihood; and
   presenting to a user the context webpage URL and the link URL, wherein the selected candidate is presented as the link title for the link URL.

6. The method as recited in claim 5, further including,
   processing the selected candidate before presentation to the user to simplify the selected candidate.

7. The method as recited in claim 5, wherein the generation parameters for a given source include,
   a probability $\alpha_s$ that the given source, when asked to construct a text instance, picks a word from a true title, and
   a probability $\beta_s$ that the given source, when asked to construct the text instance, picks a word from the context webpage.

8. The method as recited in claim 7, wherein computing a likelihood further includes,
   calculating a word probability that a source generates a specific text instance as a sum of,
      $\alpha_s$ multiplied by a number of times the specific text instance is in the true title divided by a size of the true title,
      $\beta_s$ multiplied by a number of times the specific text instance is in the context webpage divided by a size of the context webpage, and
      $(1-\alpha_s-\beta_s)$ divided by a size of a vocabulary of all possible words.

9. The method as recited in claim 8, wherein computing a likelihood further includes,
   calculating the likelihood by multiplying the word probabilities for all the words in text instances generated by the sources times a length probability that the true title has the length of the candidate.

10. The method as recited in claim 9, wherein evaluating generation parameters further includes,
    obtaining a training set of webpages, context webpages, and the corresponding true link titles, and
    maximizing the likelihood for the training set to obtain $\alpha_s$ and $\beta_s$.

11. The method as recited in claim 8, wherein the generation parameters for a given source further includes,
    a weight $\theta_s$ associated with a relevance for the given source, the relevance indicating a quality of the given source to generate text instances that are related to the link URL, and
    a weight $\theta_{len}$ associated with the length of the true title.

12. The method as recited in claim 11, wherein computing a likelihood further includes,
    calculating the likelihood by multiplying the word probabilities for all the words in the source weighted by $\theta_s$ and a length probability that the true title has the length of the candidate weighted by $\theta_{len}$.

13. The method as recited in claim 12, wherein evaluating generation parameters further includes,
    obtaining a training set of webpages, context webpages, and the corresponding true link titles, maximizing the likelihood for the training set to obtain $\alpha_s$ and $\beta_s$, and learning the $\theta_s$ for the plurality of sources using linear ranking.

14. The method as recited in claim 5, wherein presenting to a user further includes, presenting the context webpage together with the link title and one or more link titles for additional URLS embedded inside the context webpage, the additional URLs having corresponding selected candidates as their link titles.

15. The method as recited in claim 5, further including, creating a succinct sitemap for the context webpage using a plurality of URLs and their corresponding selected candidates.

16. The method as recited in claim 5, wherein the link URL corresponds to one of a video file, an image file, a portable document format (PDF) file, or a Microsoft Word file.

17. A method for presenting related URLs when displaying results from a web search, the method comprising:

obtaining a related URL embedded inside a context webpage, the context webpage being a result from the web search;

generating a plurality of candidates for a link title for the related URL;

computing a likelihood for each candidate using learned probabilities for a source to pick words from the link title, probabilities associated with each of the words in the candidate to be from the link title, and probabilities associated with the context webpage to provide words from the link title;

selecting a candidate with a highest likelihood; and presenting to a user the context webpage together with the related URL, wherein the selected candidate is presented as the link title for the related URL.

18. The method as recited in claim 17, wherein the learned probabilities for a given source to pick words from the link title include, a probability $\alpha_s$ that the given source, when asked to construct a text instance, picks a word from a true title, and a probability $\beta_s$ that the given source, when asked to construct the text instance, picks a word from the context webpage.

19. The method as recited in claim 18, wherein the probabilities associated with each of the words in the candidate are word probabilities that a source generates a specific text instance calculated as a sum of, $\alpha_s$ multiplied by a number of times the specific text instance is in the true title divided by a size of the true title, $\beta_s$ multiplied by a number of times the specific text instance is in the context webpage divided by a size of the context webpage, and $(1-\alpha_s-\beta_s)$ divided by a size of a vocabulary of all possible words.

20. The method as recited in claim 19, wherein computing a likelihood further includes, calculating the likelihood by multiplying the word probabilities for all the words in text instances generated by the sources times a length probability that the true title has the length of the candidate.

* * * * *